United States Patent
Hechler, IV et al.

[11] Patent Number: 5,110,458
[45] Date of Patent: May 5, 1992

[54] MIXER AND FLUID FILTERING UNIT

[76] Inventors: Valentine Hechler, IV, 26 Meadowview Dr., Northfield, Ill. 60093; Edward A. Schwall, 1632 Oakwood Rd., Northbrook, Ill. 60093

[21] Appl. No.: 679,686

[22] Filed: Mar. 29, 1991

[51] Int. Cl.⁵ ............................................ B01D 35/027
[52] U.S. Cl. ......................................... 210/90; 137/99; 210/134; 210/137
[58] Field of Search ............ 210/90, 134, 137, 497.01; 137/99, 599, 599.1

[56] References Cited

U.S. PATENT DOCUMENTS

| | | | |
|---|---|---|---|
| 3,865,126 | 2/1975 | Baggaley | 137/99 X |
| 3,934,604 | 1/1976 | Sanderson et al. | 137/98 |
| 4,369,805 | 1/1983 | Tavor | 137/99 X |
| 4,651,765 | 3/1987 | Beth | 137/99 |
| 4,832,072 | 5/1989 | Hechler, IV et al. | 137/44 |

Primary Examiner—Frank Spear
Attorney, Agent, or Firm—Sixbey, Friedman, Leedom & Ferguson

[57] ABSTRACT

The mixer and fluid filtering unit is connectable to a source of a first or base fluid under pressure and to a source of a second fluid or solute which may be a solute pumping unit. The base fluid flows into a mixer section through a first inlet, and a small proportion of the base fluid is diverted into a filter section where it is filtered and passed out as motive fluid for the solute pumping unit. The remainder of the base fluid flows through a compensating valve assembly and into the mixer section where it is mixed with solute by a fluid pressure operated ratio valve assembly which maintains a variable preset mixing ratio. A sensor connected to the compensating valve assembly senses filter pressure drop and adjusts the compensating valve assembly in accordance therewith.

20 Claims, 3 Drawing Sheets

MIXER AND FLUID FILTERING UNIT

TECHNICAL FIELD

The present invention relates to fluid proportioning and mixing systems generally, and more particularly to an improved mixer and fluid filtering unit for use in combination with a metering and pumping unit which pumps a miscible solute into the mixer and fluid filtering unit.

BACKGROUND ART

In recent years, the growth of the nursery and lawn care industries has created a demand for compact, inexpensive, yet accurate fluid proportioning and mixing systems. Ideally, a system of this type should operate effectively to mix, in a preset proportion, a chemical with a stream of solvent, such as water, and the ratio of chemical to water must be accurately maintained for a normal range of variables which effect both the water and chemical supplies. The system should accommodate both a wide range of primary flows and also provide the ability to adjust readily and continuously the proportioning ratio over a range of continuously desirable settings. In addition, the proportioning and mixing unit must be compact and formed of material which is both inert to a wide range of chemical ingredients normally mixed with water and must remain operative over a wide range of temperatures. The device should be driven by power derived from the water supply without creating a substantial pressure drop in the water supplied as a solvent, and the water supply should be positively protected from backflow contamination by the chemical used as a solute.

Such a fluid proportioning and mixing system is shown by our previous U.S. Pat. No. 4,832,072. This patented fluid proportioning and mixing unit includes a metering and pumping section in combination with a mixer unit, and the mixer unit operates effectively with an input water flow of 50 gallons per minute. A similar mixer unit might operate effectively at a higher capacity unit if effective filtering could be achieved. However, commercially available filters which will satisfactorily filter the entire input base fluid flow to a high capacity mixer unit of the type shown in our prior patent are extremely expensive and bulky and would present routine maintenance problems. Consequently, it has not been practical to provide a large capacity mixer unit of the type shown in our previous patent due to the expense and mechanical disadvantages involved in providing a filter to filter the entire large capacity flow through the mixer.

DISCLOSURE OF THE INVENTION

It is a primary object of the present invention to provide a novel and improved mixer and fluid filtering unit for use with a metering and pumping unit driven by motive fluid diverted from an input flow into the mixer and fluid filtering unit. The diverted motive fluid is filtered, while the main fluid flow through a mixer section of the mixer and fluid filtering unit is unfiltered.

Another object of the present invention is to provide a novel and improved mixer and fluid filtering unit which receives solute measured by a metering and pumping unit and which includes a ratio valve assembly to control a water/solute ratio provided by the mixer and fluid filtering unit. Input water to a mixer section of the mixer and fluid filtering unit is mixed with solute as it passes through the mixer portion, and a small volume of this water is diverted before becoming mixed with solute and is filtered in the fluid filtering unit. This filtered water is provided as motive fluid to the metering and pumping unit, and is also provided as a constant flow of cleansing fluid to prevent particles from contaminating the ratio valve assembly.

A still further object of the present invention is to provide a novel and improved mixer and fluid filtering unit having a mixer section and a fluid filtering section. A compensating valve assembly is mounted in the mixer section in front of a ratio valve assembly and is attached to a piston in the fluid filtering section which senses the pressure drop across a filter. The piston then operates to control a compensating valve in the compensating valve assembly so that the pressure drop across the compensating valve is maintained equal to that across the filter. This relationship is maintained regardless of the volume of fluid flow through the mixer section.

Yet another object of the present invention is to provide a novel and improved mixer and fluid filtering unit having a mixer section and a fluid filtering section. The fluid flow through the mixer section is unfiltered, while a small percentage of this flow is diverted and filtered in the fluid filtering section. Fluid pressure to the mixing section is controlled in accordance with the pressure drop across a fluid filter in the fluid filtering unit, and the control unit for accomplishing this function is offset from the fluid flow path through the mixer section so as not to interfere with fluid flow through the mixer section.

Still another object of the present invention is to provide a novel and improved mixer and fluid filtering unit having a mixer section and a fluid filtering section. A portion of a base fluid flowing through the mixer section is diverted and filtered in the fluid filtering section which includes a visual indicator to provide an indication of the state of the filter within the fluid filtering section.

These and other objects of the present invention are accomplished by providing a mixer and fluid filtering unit having a mixer section for receiving a base fluid, such as water, from a fluid inlet port and passing this base fluid through the mixer section to a fluid outlet port. Within the mixer section, the water or base fluid is mixed with a solute by a ratio valve assembly, and spaced from the ratio valve assembly on the inlet side of the mixer section is a compensating valve assembly which provides a pressure drop to match that across a filter in a separate fluid filtering unit. This fluid filtering unit is attached to the mixer section but is offset therefrom and contains a fluid filter which receives a small proportion of the input flow through the fluid inlet port of the mixer section. The pressure drop across the filter is sensed by a piston which is mechanically attached to the compensating valve assembly, and in the absence of a pressure drop across the filter, the piston and a compensating valve in the compensating valve assembly which is attached to the piston are free to float. However, if a pressure drip develops across the filter, this drop also appears across the piston which then moves to close the compensating valve to a point where the drop across the valve equals that across the piston and the filter. The drop across the compensating valve assembly is always that of the filter regardless of the volume of fluid flow through the fluid inlet port for the mixer section.

BEST MODE FOR CARRYING OUT THE INVENTION

Figure 1:
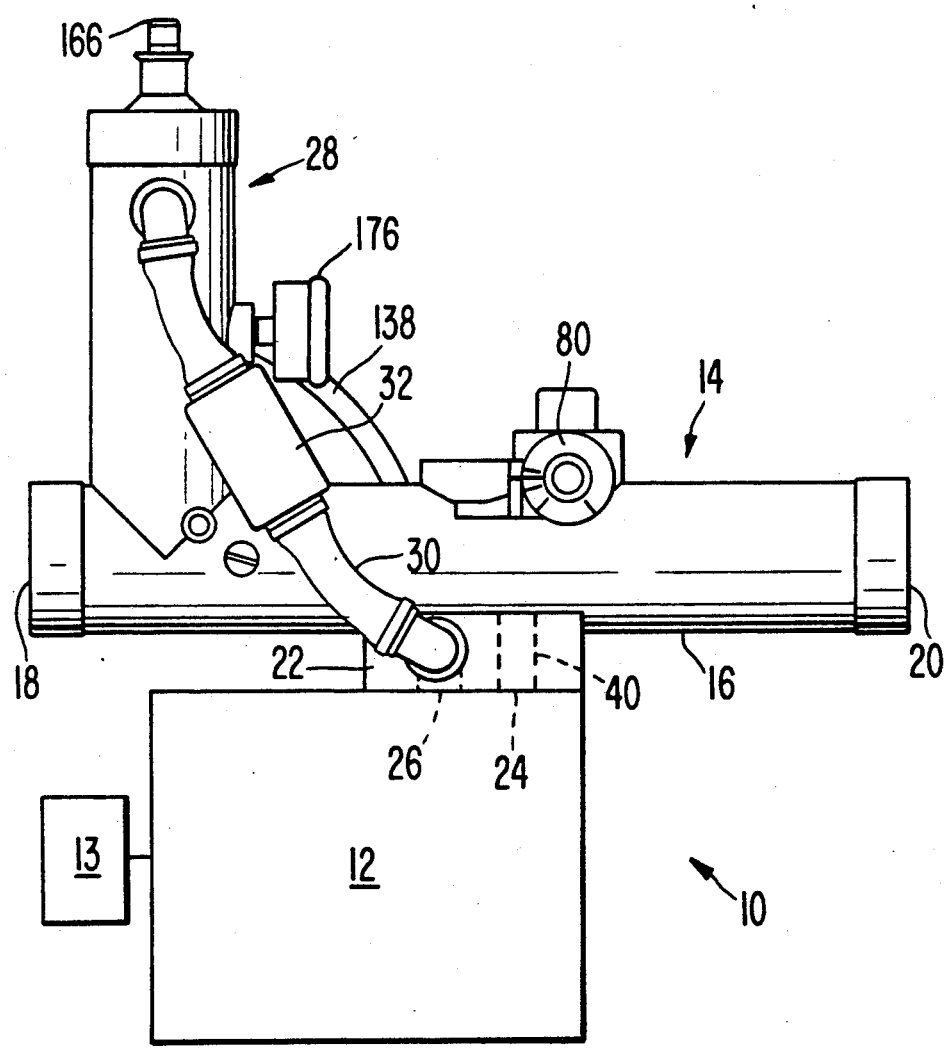
FIG. 1 is a view in side elevation of the mixer and fluid filtering unit of the present invention.

Referring now to FIG. 1, the mixer and fluid filtering unit of the present invention indicated generally at 10 is combined with a pumping unit 12 to form a fluid proportioning and mixing unit. The pumping unit 12 is of the type which is powered by a small volume of fluid, and this motive fluid for the pumping unit can be diverted from a high volume fluid flow through the mixer and fluid filtering unit 10. The pumping unit then operates to pump solute from a solute source 13 back to the mixer and fluid filtering unit. The structure of a pumping unit of this type is disclosed by our prior U.S. Pat. No. 4,832,072, the disclosure of which is incorporated herein by reference.

The mixer and fluid filtering unit 10 includes a mixer section 14 having a tubular body 16 with a fluid inlet port 18 provided at one end thereof and a fluid outlet port 20 formed at the opposite end thereof. The fluid inlet port is connected to a source of water or other fluid under pressure which is to be mixed with a chemical concentrate or solute provided by the pumping unit 12, and the tubular body is mounted upon the metering and pumping unit by a connector mount 22. The connector mount includes conduits which pass solute to the mixer section from an outlet 24 of the pumping unit and which provide motive fluid to an inlet 26 of the pumping unit. The mixer and fluid filtering unit 10 includes a filter and flow control section 28 which provides motive fluid to the connector mount and the inlet 26 by means of a motive fluid conduit 30. The motive fluid conduit may include a flow limiter 32 which will be subsequently described.

Figure 2:
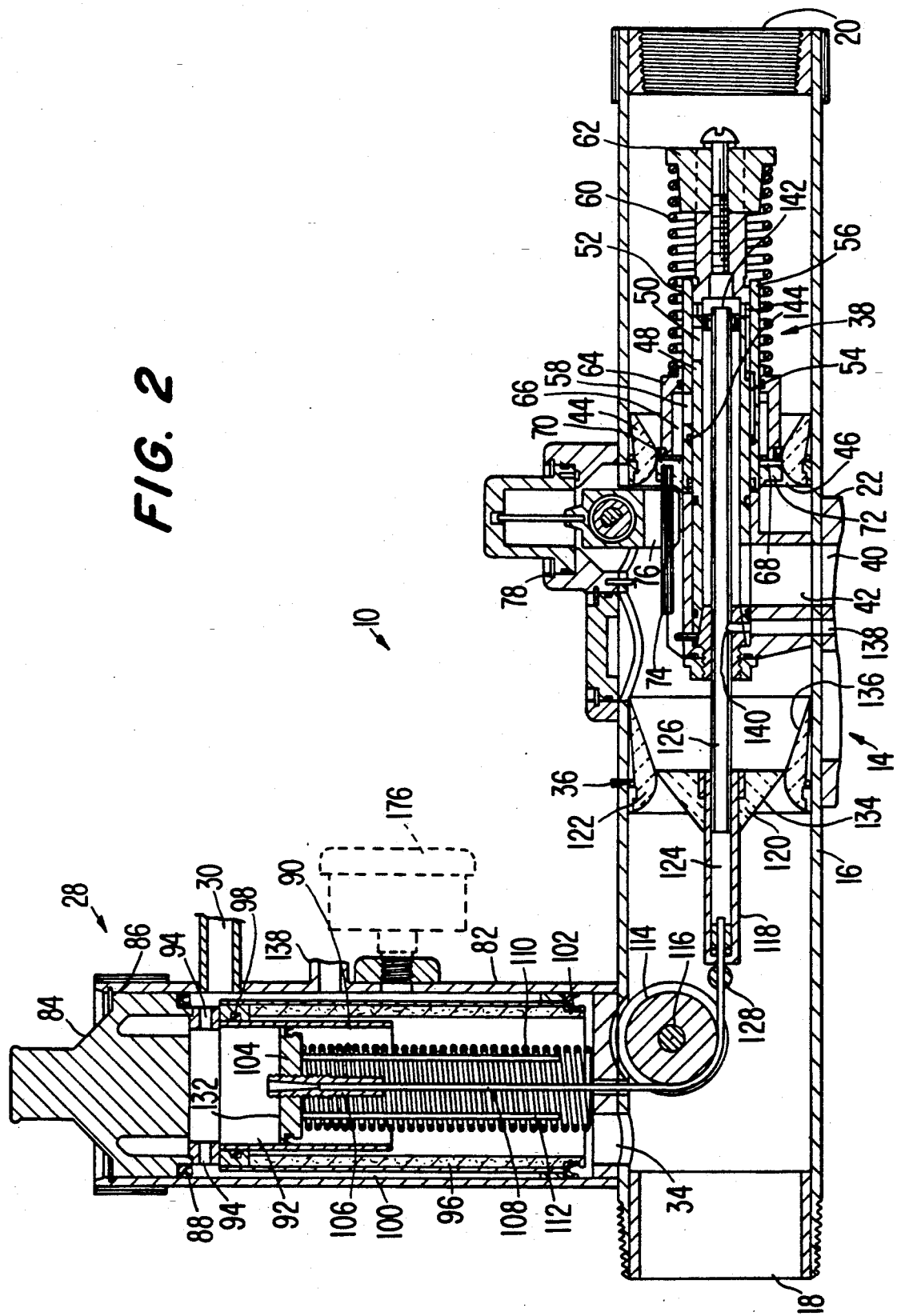
FIG. 2 is a sectional view of the mixer and fluid filtering unit of FIG. 1.

Turning now to FIG. 2, water or another base fluid to be mixed with a chemical concentrate flows under pressure into the mixer section body 16 through the fluid inlet port 18 and passes toward the fluid outlet port 20. A small percentage of this fluid, sometimes as little as less than one percent, is diverted for motive fluid through an opening 34 into the filter and flow control section 28. The remainder of the fluid passes through a compensating valve assembly 36 to a ratio valve assembly 38 where it is mixed with solute provided from the pumping unit 12 through a conduit 40 in the connector mount 22 to a ratio valve assembly solute inlet 42.

The ratio valve assembly 38 is substantially the same as that described in our previous U.S. Pat. No. 4,832,072, and includes a ceramic valve seat 44 which defines an entry opening 46 for the water or other base fluid. Extending centrally of the entry opening 46 is a hollow post 48 which is connected to receive solute from the solute inlet 42. This hollow post is provided with a wide exit slot 50 formed therein to be spaced from the solute inlet and the opposite closed end of the post so that solute passes through the hollow post to the exit slot.

Mounted upon the hollow post 48 for movement along the post is a bobbin member 52, and this bobbin member is also mounted for controlled rotational movement on the post. The bobbin member includes a central shaft 54 to receive the hollow post 48, and this central shaft is defined by a shaft wall 56. The shaft wall includes a slot 58 which can move into registry with the exit slot 50 as the bobbin moves along the post 48 against the bias of a spring 60. At one end, the spring 60 engages a spring retainer 62 which is secured to the closed end of the hollow post 48, while the opposite end of the spring engages a skirt 64 which extends outwardly from the shaft wall 56 and provides an enclosed chamber 66 around the shaft wall which communicates with the shaft wall slot 58. Radial passages 68 extend from the chamber 66 through a valve member 72 at the end of the skirt 64 to permit fluid to flow outwardly from the skirt.

The spring 60 biases the skirt 64 into engagement with the valve seat 44. An O-ring or similar seal 70 mounted on the outer surface of the skirt 64 combines with a ceramic valve member 72 to engage the valve seat 44 and close the entry opening 46. When fluid pressure against the ceramic valve member 72 compresses the spring 60, the bobbin member 52 will move toward the fluid outlet port 20, and the O-ring 70 and valve 72 will move out of engagement with the valve seat 44 thereby permitting fluid to pass through the entry opening 46. As the shaft wall slot 58 begins to move into registry with the wide exit slot 50 which has been previously closed by the shaft wall 56 when the entry opening 46 is closed, solute from the hollow post will pass through the wide exit slot and the shaft wall slot into the chamber 66 and out through the radial passages 68 to mix with the fluid flowing through the entry opening 46 to the fluid outlet port 20. As the bobbin moves farther toward the outlet port, more of the shaft wall slot 58 will move into alignment with the wide exit slot 50, and more solute will be metered into the fluid passing around the bobbin skirt. The greater the volume of the fluid moving through the fluid inlet port 18, the greater will be the fluid pressure on the bobbin, and as the bobbin responds and moves toward the outlet port, a greater concentrate of solute will be metered into this fluid. Thus, regardless of inlet fluid pressure, a predetermined water/solute ratio is maintained.

To preset the solute to water ratio to be maintained by the ratio valve assembly 38, the bobbin member 52 is rotated on the hollow post 48. This rotates the shaft wall slot 58 relative to the wide exit slot 50 so that only a predetermined portion of the shaft wall slot can overlap and communicate with the wide exit slot. The ratio can be decreased or increased by rotating the bobbin member so that a lesser or a greater portion of the shaft wall slot can communicate with the wide exit slot.

The bobbin member 52 is rotated by an adjusting pin 74 which extends outwardly from the bobbin member and which is received by a threaded follower member 76. The follower member engages a threaded shaft 78 mounted for rotation on the tubular body 16, and this shaft may be manually rotated by an indicator knob 80. Rotation of the shaft causes the follower member to rotate the bobbin member on the hollow post 48 for a limited extent.

The filter and flow control section 28 operates to filter the motive fluid supplied from the mixer section to the pumping unit 12, and also operates to provide a pressure compensation function in the mixer section 14. By filtering only the motive fluid for the metering and pumping unit and not the total fluid flow through the mixer section, a much smaller and less expensive filter may be effectively employed.

The filter and flow control section 28 includes a tubular housing 82 having one end which is secured to the tubular body 16 of the mixer section 14. The opposite end of the tubular housing is closed by a removable cap 84 that is held in place by a snap ring 86 or other suitable retaining means, such as threads between the cap and the tubular housing. The cap is sealed to the tubular housing by an O-ring seal 88.

Depending from the cap 84 is an open ended tubular valve guide 90 having an inner surface 92 which coated with teflon or some similar low friction bearing material. The cap is provided with through slots 94 positioned above the valve guide 90, and a removable filter 96 slides over the valve guide with one end of the filter being sealed to the outer surface of the valve guide by an O-ring seal 98. This filter is a cylindrical filter having a diameter which is less than the diameter of the tubular housing 82 so that an outer chamber 100 is formed between the outer surface of the filter and the inner surface of the tubular housing. The lower end of the filter is sealed to the tubular housing by an O-ring seal 102.

When the cap 84 is removed from the tubular housing 82, the valve guide 90 and filter 96 will also be removed with the cap, so that the filter may be either cleaned or changed. When the cap and filter are inserted into the open end of the tubular housing 82, the valve guide 90 will slide over a piston 104. This piston has a depending stem 106 which is secured to one end of a flexible cable 108.

The piston 104 is biased toward the cap 84 by one or more long springs 110 having many turns so that the change in force over the piston stroke remains essentially constant. Each spring is supported from buckling by four spaced teflon rods 112 extending downwardly from the piston inside the convolutions of the spring. The teflon rods may terminate a spaced distance above the lower end of the tubular housing 82 to permit a limited piston stroke, or alternatively, may extend through the bottom of the tubular housing. The spring or springs 110 cause the piston 104 to cause the filtered fluid which has passed through the filter to have a slightly higher pressure than the pressure of the fluid flowing through the mixer section 14.

The cable 108 extends from the piston stem 106 about a pulley 114 which is mounted for rotation upon a shaft 116 that extends transversely across the interior of the tubular body 16 and is secured at its ends thereto. The end of the cable 108 opposite the end secured to the piston stem 106 is connected to a compensating valve stem 118 which projects from a ceramic compensating valve 120 for the compensating valve assembly 36. This compensating valve assembly also includes a ceramic valve seat 122 which cooperates with the compensating valve 120. It will be noted that the valve seat 122 is provided with a rounded surface which tapers outwardly toward the fluid outlet port 20, and this outward curve is shaped to maintain a drop equal to the combined drop of the filter and spring over the entire movement of the compensating valve. The valve seat 44 is shaped to maintain a constant proportion.

The compensating valve stem 118 includes a central open ended chamber 124 to receive one end of a hollow support shaft 126 which projects from and is secured to the ratio valve assembly 38. Thus, the compensating valve 120 is permitted to move along the support shaft 126 which operates as a guide for the compensating valve. Movement of the compensating valve toward the fluid inlet port 18 is limited by a valve stop 128 which is engaged by the compensating valve stem 118 when the compensating valve 120 is in the closed position.

When fluid flows into the mixer section 14 through the fluid inlet port 18, it contacts the compensating valve 120 and forces the valve open against the bias of the combined filter drop and force of the spring 110. As the compensating valve opens, the piston 104 is drawn downwardly away from the cap 84 by the cable 108. A limited portion of the fluid passing in through the fluid inlet port 18 is diverted to flow into the filter and flow control section 28 through the inlet opening 34 provided in the tubular body 16. This diverted fluid flows internally within the filter 96 into contact with the underside of the piston 104, and is forced through the filter into the outer chamber 100. This filtered fluid then passes over the top of the piston 104 by means of the through slots 94 and into the motive fluid conduit 30 which transports the motive fluid to the pumping unit 12.

The structure of the compensating valve assembly is critical, for this assembly cooperates with the piston 104 to compensate for pressure drops which develop across the filter 96 as the filter becomes dirty and partially clogged over time. Without the compensating valve assembly, as the filter becomes partially clogged, a drop in pressure would appear across the filter, and more of the total flow of fluid from the fluid inlet port 18 would be directed through the mixer section, thereby altering the motive fluid flow to the metering and pumping unit 12. The pressure to operate the metering and pumping unit would become less by the amount of this developing drop, and as the drop across the filter becomes larger, a point could be reached where the metering and pumping unit ceases to operate. To prevent this, the compensating valve assembly 36 is formed to create a partial, variable impediment to the flow of fluid such that the pressure drop across this impediment almost exactly matches that across the filter 96 irrespective of the magnitude of this drop or the rate of flow through the mixer section 14. The area of the compensating piston 120 which is contacted by the incoming fluid flow exactly matches the area of the piston 104 which is contacted by fluid, so that the piston sees the same water pressure on its cable side as does the compensating valve, thereby balancing the system at any pressure. Thus, the area of the compensation valve matches that of the piston, while the curvature of the valve seat 122 compensates for the spring induced drop caused by compression of the spring 110, and this results in a relatively constant flow of filtered motive fluid through the motive fluid conduit 30 regardless of variations in pressure drop across the filter 96.

It will be noted that the spring side of the piston 104 contacts the fluid on the interior of the filter 96, while the filtered fluid from the through slots 94 contacts the opposite or upper side 132 of the piston. Thus, when the filter is clean, the pressure across the piston is zero, and it is free to float as is the compensating valve 120, and the compensating valve therefore presents no pressure drop to the mixer section 14. However, as the filter becomes partially clogged and a pressure drop across the filter develops, this drop also appears across the piston 104 which moves upwardly toward the cap 84 to cause the cable 108 to move the compensating valve 120 toward the closed position to an extent whereby the drop across the compensating valve assembly 36 equals that across the piston 104 which is actually the drop across the filter 96. The compensating valve 120 and the piston 104 both move back and forth at all times in rhythm with the flow through the fluid inlet port 18 as it gets larger or smaller, and yet the drop across the compensating valve assembly is always equal to that across the filter.

As previously indicated, the spring 110 causes the filtered fluid from the filter to have a slightly higher pressure than the fluid passing through the mixer section 14. To accomplish this, the spring causes the cable 108 to maintain pressure on the compensating valve 134 which causes a predetermined pressure drop across the compensating valve assembly to reduce the pressure of the fluid passing through the compensating valve assembly.

The compensating valve assembly 36 is specifically shaped to maintain this constant pressure drop while duplicating the pressure drop across the filter 96 for the full stroke of the compensating valve 120. This is achieved by angling the forward face 134 of the compensating valve outwardly from the compensating valve stem 118 toward the fluid outlet port 120 so that the overall shape of the compensating valve is essentially a triangle. As has been previously noted, the valve seat 122 has an outwardly curved and angled face 136 which is designed to compensate for the compression of the spring 110. The angle of the forward face 134 of the compensating valve 120 should be designed relative to the angle of the curved seat face 136 so that as the valve travels over the length of its stroke, a constant pressure drop is maintained. This constant pressure drop should include the pressure drop mechanically induced by the action of the spring 110 on the bottom side of the piston 104 which is then transmitted by the cable to cause a pressure drop across the compensating valve assembly. The relative angles between the forward face 134 of the compensating valve and the curved valve seat face 136 are designed to maintain the spring induced pressure drop throughout the stroke of the compensating valve. If this angular relationship is not maintained, water turbulence created as the valve changes position will cause a variable pressure drop which might be greater than that induced mechanically by the spring 110.

Filtered water from the filter and flow control section 28 is provided both to the motive fluid conduit 30 and also to a second conduit 138 which is connected to the connector mount 22. Filtered fluid flows through the conduit 138 and an opening 140 in the hollow shaft 126, and this filtered fluid, due to the pressure drop mechanically induced by the action of the spring 110, has a pressure which is higher than the pressure of the fluid passing around the ratio valve assembly 38 to the fluid outlet port 20. This pressurized, filtered fluid flows from an open end 142 of the shaft 126 and into passages 144 between the hollow post 48 and the shaft wall 56 of the bobbin member 52 to provide a particle blocking and cleansing flow between the hollow shaft and the bobbin to prevent them from seizing up. The use of higher pressure filtered water for this purpose is critical since the water passing through the mixer section 14 between the fluid inlet port 18 and the fluid outlet port 20 is substantially unfiltered and could contain a number of particles. These same particles can abrade the compensating valve assembly 36 and the valve 72 and valve seat 44, which is why these components are formed of hard fixed and precision ground ceramic.

Figure 4:
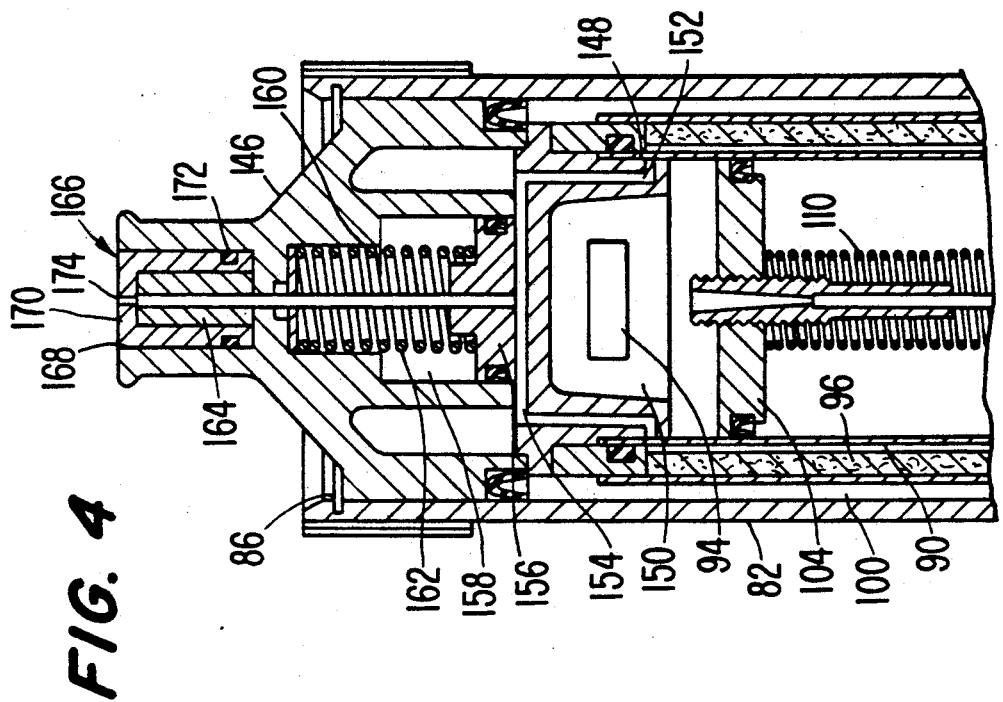
FIG. 4 is a sectional view of a portion of the fluid filtering section for the mixer and fluid filtering unit of FIG. 1.
Figure 3:
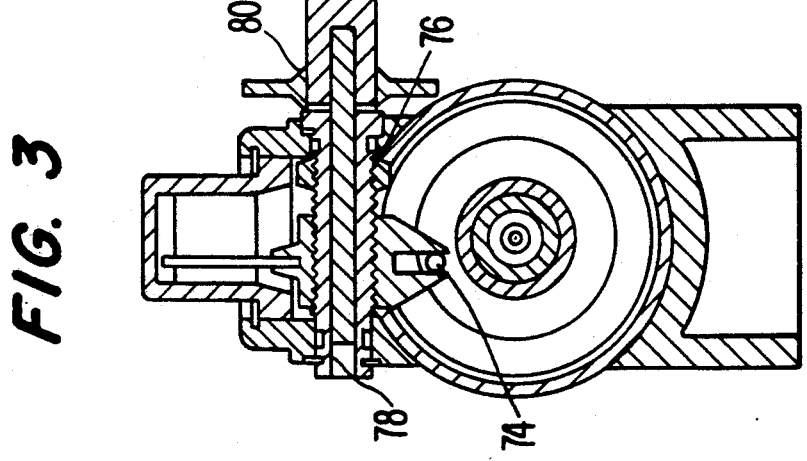
FIG. 3 is a cross-sectional view of the mixer and fluid filtering unit of FIG. 1.

The cap structure 84 of FIG. 2 may be modified as illustrated in FIG. 4 to include an indicator button which signals when the filter 96 has been clogged to a point where it should be cleaned or changed. Referring to FIG. 4, the cap 84 of FIG. 2 is replaced by a cap 146 having a bottom wall 148 which defines a chamber area 150 above the piston 104. Through slots 94 formed in the cap below the cap bottom wall permit filtered fluid from the outer chamber 100 to fill the chamber 150 above the piston.

The cap bottom wall 148 has one or more openings 152 which communicate with the fluid inside the filter 96, and which permit this fluid to flow into a passage 154 above the cap bottom wall. This fluid within the passage 154 contacts a piston 156, and when the fluid pressure exceeds a predetermined point, the piston is driven into a piston chamber 158 against the bias of a spring 160. The piston is provided with a projecting piston shaft 162 which is secured at its upper end to a cylindrical inner section 164 of an indicator button 166. The indicator button 166 is mounted within a recess 168 formed in the top of the cap 146, and includes a cup shaped outer section 170 which is mounted upon the cylindrical inner section 164 so that the cylindrical inner section can move longitudinally relative thereto. The cup shaped outer section is provided with an O-ring seal 172 which engages the wall of the recess 168.

When the filter 96 begins to clog, the pressure of the fluid on the underside of the piston 104 rises, as does the pressure of the fluid in the passage 154 acting on the piston 156. As this pressure rise overcomes the bias of the spring 160, the piston moves into the piston chamber 158 causing the piston shaft 162 to begin to drive the indicator button 166 upwardly out of the recess 168. Spaced indicia provided on the outer surface of the cup shaped outer section 170 for the indicator button 166 will become successively exposed as the indicator button moves upwardly to provide a visual indication of filter status. When the lowermost indicia is reached, an indication is provided that the filter must be changed.

To provide a constant indication of filter condition, the cylindrical inner section 164 is permitted to move longitudinally relative to the cup shaped outer section 170 of the indicator button. Thus, if the indicator button moves outwardly from the recess 168 to provide an initial indication that the filter is starting to become dirty, and then fluid flow through the mixer section 14 is terminated, the spring 160 will return the piston 156 to its initial starting position. However, the pressure of the seal 172 against the wall of the recess 168 will maintain the cup shaped outer section in position as the cylindrical inner section 164 moves downwardly, and thus the indication of filter condition will be maintained even though fluid pressure in the passage 154 has dropped. When fluid flow through the mixer section is again initiated, the piston 156 will again move upwardly causing the cylindrical inner section 164 to move back into position under the cup shaped outer section 170. To prevent air pressure or fluid from building up between the cylindrical inner section and the cup shaped outer section, an exhaust opening 174 is provided in the cup shaped outer section.

In some instances, it may be desirable to constantly monitor the pressure of the filtered fluid in the outer chamber 100, and for this purpose, a pressure gauge 176 may be mounted on the tubular housing 82 in communication with the outer chamber 100.

If the fluid flow through the filter 96 should suddenly surge to a greater value than normal, the drop across the filter would rise with a resultant increase in mechanical force and friction. This could reach a point where the mechanically induced drop for the filtered fluid is lost, and the decrease in filtered flushing fluid flow between the hollow post 48 and the bobbin member 52 could result in contamination from the solute and/or the fluid flowing through the mixer section. Such a surge in flow through the filter might result from air being pumped by the pumping unit 12, as often occurs when the unit first begins to operate or when the supply of solute is low. In such cases, the pumping speed of the pumping unit tends to increase rapidly, since air presents less resistance to the pumping action then does solute.

The addition of a flow limiter 32 to the motive fluid conduit 30 will shut off motive fluid flow which is excessive thereby preventing an excessive and prolonged fluid surge through the filter 96. Any known flow limiter valve which operates to decrease fluid flow through the conduit 30 as fluid pressure increases and to terminate fluid flow when the fluid pressure reaches a predetermined amount may be used for the flow limiter valve 32.

Industrial Applicability

The mixer and fluid filtering unit 10 of the present invention may be effectively employed in combination with a known pumping unit to mix a first base fluid with a second fluid or solute in a preset dilution ratio. The unit operates effectively to maintain the preset ratio regardless of fluid pressure and flow variations, and a large volume of unfiltered base fluid may be permitted to flow through the mixer and filtering unit. This is achieved by filtering only a very small volume of the base fluid and using this small volume as a motive fluid for the pumping unit.

I claim:

1. A mixer and fluid filtering unit connectable to a source of a first fluid under pressure and a source of a second fluid and operative to filter a small proportion of the first fluid received thereby while mixing the remainder of said first fluid with said second fluid in a predetermined ratio and maintaining said predetermined ratio regardless of pressure changes in said first fluid comprising:

body means having a first fluid inlet means to receive said first fluid under pressure, a second fluid inlet means to receive said second fluid and a mixed fluid outlet means spaced from said first fluid inlet means, said body means operating to conduct fluid flowing from said first fluid inlet means to said mixed fluid outlet means, motive fluid filtering means provided adjacent to said first fluid inlet means, and operating to separate a portion of the first fluid, said motive fluid filtering means including a filter means for filtering the separate portion of said first fluid and sensing means to sense the condition of said filter means, and ratio valve means mounted within said body means between said first fluid inlet means and said mixed fluid outlet means, said ratio valve means being connected to receive said second fluid from said second fluid inlet means and operating in response to the fluid pressure of said first fluid to mix said second fluid with said first fluid.

2. The mixer and fluid filtering unit of claim 1 wherein said motive fluid filtering means includes a first outlet for filtered fluid from said filter means, and filtered fluid conduit means between said first outlet and said ratio valve means, said filtered fluid conduit means providing filtered fluid to said ratio valve means.

3. The mixer and fluid filtering unit of claim 2 wherein said motive fluid filtering means includes pressure control means to maintain the pressure of the filtered fluid from said filter means at a higher pressure than the first fluid from said first fluid inlet means flowing to said mixed fluid outlet means.

4. The mixer and fluid filtering means of claim 3 wherein said ratio valve means includes a valve inlet port connected to receive said first fluid from said first fluid inlet means, said valve inlet port having a port defining wall, a hollow solute post connected to receive said second fluid from said second fluid inlet means, said hollow solute post having a closed terminal end and a solute metering slot means formed in spaced relationship to said closed terminal end to permit said second fluid to flow outwardly from said hollow solute post, and bobbin means mounted on said hollow solute post for both rotational and longitudinal movement, said bobbin means having a shaft receiving opening defined by a perimeter wall to receive said hollow solute post and a skirt means with valve closure means formed at one end thereof, said skirt means having an inner chamber with outlet opening means extending from said inner chamber, the bobbin means being adapted to move longitudinally relative to said hollow solute post in response to the pressure of said first fluid from a closure position where the valve closure means of said bobbin means engages said port defining wall to close said inlet port to said first fluid, said perimeter wall being formed to close said solute metering slot when said bobbin means is in said closure position.

5. The mixer and fluid filtering unit of claim 4 wherein said ratio valve means includes fluid passage means to conduct fluid between said hollow solute post and the perimeter wall of said bobbing means, said fluid passage means being connected to receive filtered fluid from said filtered fluid conduit means.

6. The mixer and fluid filtering unit of claim 1 wherein said motive fluid filtering means includes a filter housing section mounted on said body means and including a fluid inlet from said body means, said filter means including a cylindrical filter spaced from said filter housing section to provide a filtered fluid chamber between said cylindrical filter and said filter housing section, said cylindrical filter defining an inner chamber in communication with said fluid inlet to receive the separated portion of said first fluid to be filtered.

7. The mixer and fluid filtering unit of claim 6 wherein said sensing means to sense the condition of said filter includes piston means mounted on said filter housing to sense the fluid pressure in the inner chamber of said cylindrical filter, said piston means operating in response to rising fluid pressure in said inner chamber to move relative to said filter housing and indicator means mounted on said filter housing for movement outwardly therefrom, said indicator means being connected to said piston means.

8. The mixer and fluid filtering unit of claim 1, which includes a compensating valve means mounted within said body means between said first fluid inlet means and said ratio valve means, said compensating valve means operating to open in response to the fluid pressure of said first fluid inlet, said sensing means being connected to said compensating valve means and operating to control said compensating valve means to vary the fluid pressure drop across said compensating valve means.

9. The mixer and fluid filtering unit of claim 8 wherein said filter means extends between a first area containing the unfiltered separated portion of said first fluid and a second area containing filtered fluid which has passed through said filter means, said sensing means operating to sense the fluid pressure drop across said filter means between said first and second areas and to adjust the fluid pressure drop across said compensating valve means by an equal amount.

10. The mixer and fluid filtering unit of claim 9 wherein said motive fluid filtering means includes a filter housing section mounted on said body means and including a separated fluid inlet from said body means, said filter means including a cylindrical filter defining an inner chamber in communication with said separated fluid inlet to form said first area, said sensing means including a piston mounted within said inner chamber between said first and second areas, said piston having a first side in contact with unfiltered fluid in said first area and a second side in contact with filtered fluid in said second area.

11. The mixer and fluid filtering unit of claim 10 wherein said compensating valve means includes a valve seat and a compensating valve movable toward and away from engagement with said valve seat, said piston being mounted for movement within said inner chamber and connector means extending between said piston and compensating valve whereby movement of one causes movement of the other.

12. The mixer and fluid filtering unit of claim 11 wherein the surface area of said piston contacted by said unfiltered fluid is equal to the surface area of said compensating valve contacted by said first fluid flowing through said body.

13. The mixer and fluid filtering unit of claim 10 wherein said sensing means includes spring means in engagement with said piston to bias said piston toward said filtered fluid contacting the second side of said piston to maintain the pressure of the filtered fluid at a higher pressure than that of the first fluid from said first fluid inlet means flowing through said body.

14. The mixer and fluid filtering unit of claim 13 wherein said motive fluid filtering means includes a first outlet for filtered fluid from said filter means, and filtered fluid conduit means between said first outlet and said ratio valve means, said filtered fluid conduit means providing filtered fluid to said ratio valve means.

15. The mixer and fluid filtering unit of claim 14 wherein said ratio valve means includes a valve inlet port connected to receive said first fluid from said first fluid inlet means, said valve inlet port having a port defining wall, a hollow solute post connected to receive said second fluid from said second fluid inlet means, said hollow solute post having a closed terminal end and a solute metering slot means formed in spaced relationship to said closed terminal end to permit said second fluid to flow outwardly from said hollow solute post, and bobbin means mounted on said hollow solute post for both rotational and longitudinal movement, said bobbin means having a shaft receiving opening defined by a perimeter wall to receive said hollow solute post and a skirt means with valve closure means formed at one end thereof, said skirt means having an inner chamber with outlet opening means extending from said inner chamber, the bobbin means being adapted to move longitudinally relative to said hollow solute post in response to the pressure of said first fluid from a closure position where the valve closure means of said bobbin means engages said port defining wall to close said inlet port to said first fluid, said perimeter wall being formed to close said solute metering slot when said bobbin means is in said closure position.

16. The mixer and fluid filtering unit of claim 15 wherein said ratio valve means includes fluid passage means to conduct fluid between said hollow solute post and the perimeter wall of said bobbin means, said fluid passage means being connected to receive filtered fluid from said filtered fluid conduit means.

17. A high volume fluid proportioning and mixing unit connectable to a source of a first fluid under pressure and to a source of a second fluid to be mixed with said first fluid comprising a pumping means driven by motive fluid connectable to said source of a second fluid, said pumping means including a solute outlet and operative to pump metered amounts of said second fluid to said solute outlet, and a mixer and fluid filtering unit connectable to said source of the first fluid and including body means having a first fluid inlet means to receive said first fluid under pressure, a second fluid inlet means connected to said solute outlet to receive said second fluid and a mixed fluid outlet means spaced from said first fluid inlet means, motive fluid filtering means provided adjacent to said first fluid inlet means and operating to separate and filter a portion of the first fluid and provide said filtered fluid portion as motive fluid to said metering and pumping unit, said motive fluid filtering means including a filter means for filtering the separated portion of said first fluid and sensing means to sense the condition of said filter means, and ratio valve means mounted within said body means between said first fluid inlet means and said mixed fluid outlet means, said ratio valve means being connected to receive said second fluid from said second fluid inlet means and operating in response to the fluid pressure of said first fluid to mix said second fluid with said first fluid.

18. The fluid proportioning and mixing unit of claim 17 wherein said motive fluid filtering means includes an exit conduit means connected to provide filtered motive fluid to said pumping means, said exit conduit means including flow limiter means to terminate the flow of motive fluid to said metering and pumping means when the flow through said exit conduit means exceeds a predetermined volume limit.

19. The fluid proportioning and mixing unit of claim 17 which includes a compensating valve means mounted within said body means between said first fluid inlet means and said ratio valve means, said compensating valve means operating to open in response to the fluid pressure of said first fluid inlet, said sensing means being connected to said compensating valve means and operating to control said compensating valve means to vary the fluid pressure drop across said compensating valve means.

20. The fluid proportioning and mixing unit of claim 19 wherein said filter means extends between a first area containing the unfiltered separated portion of said first fluid and a second area containing filtered fluid which has passed through said filter means, said sensing means operating to sense the fluid pressure drop across said filter means between said first and second areas and to adjust the fluid pressure drop across said compensating valve means by an equal amount.

* * * * *